United States Patent
Ali et al.

(10) Patent No.: US 8,902,754 B2
(45) Date of Patent: Dec. 2, 2014

(54) SESSION-AWARE GTPV2 LOAD BALANCING

(75) Inventors: Syed Muntaqa Ali, Richardson, TX (US); Stephen David Croll, Garland, TX (US); Aleksey G. Ivershen, Garland, TX (US); Vignesh Janakiraman, Plano, TX (US); John Peter Curtin, Richardson, TX (US)

(73) Assignee: Tektronix, Inc., Beaverton, OR (US)

( * ) Notice: Subject to any disclaimer, the term of this patent is extended or adjusted under 35 U.S.C. 154(b) by 46 days.

(21) Appl. No.: 13/531,517

(22) Filed: Jun. 23, 2012

(65) Prior Publication Data

US 2013/0272127 A1 Oct. 17, 2013

Related U.S. Application Data

(60) Provisional application No. 61/625,666, filed on Apr. 17, 2012.

(51) Int. Cl.
*H04L 12/801* (2013.01)

(52) U.S. Cl.
USPC .......................... 370/235; 370/241; 370/328

(58) Field of Classification Search
CPC .................................................. H04W 28/08
USPC ......................................... 370/235, 241, 328
See application file for complete search history.

(56) References Cited

U.S. PATENT DOCUMENTS 8,514,809 B2 * 8/2013 Hwang et al. ................. 370/331
2002/0181468 A1 * 12/2002 Lucidarme et al. ........ 370/395.2

(Continued)

FOREIGN PATENT DOCUMENTS

| CN | 101 582 884 A | 11/2009 |
| EP | 2 469 752 A1 | 6/2012 |
| WO | 2008/047231 A2 | 4/2008 |

OTHER PUBLICATIONS

"3rd Generation Partnership Project; Technical Specification Group Core Network and Terminals; 3GPP Evolved Packet Ssytem; Evolved GPRS Tunnelling Protocol (eGTP) for EPS; Stage 3 (Release 8)", Global System for Mobile Communications, V0.2.0; pp. 1-38 (2008).

(Continued)

*Primary Examiner* — Asad Nawaz
*Assistant Examiner* — Berhanu Belete
(74) *Attorney, Agent, or Firm* — Edwards Wildman Palmer LLP; Scott D. Wofsy; Christopher J. Capelli

(57) ABSTRACT

Systems and methods for session-aware GTPv2 load balancing are described. In some embodiments, a method may include receiving a first and a second transaction between an MME and an S-GW over an S11 interface of an LTE/SAE network using a control portion of a second version of a GTPv2-C protocol and storing an uplink UP TEId and IP address, a downlink CP TEId and IP address, and an uplink CP TEId and IP address obtained from the first transaction, and a downlink UP TEId and IP address obtained from the second transaction. The method may further include identifying messages between an eNodeB and the S-GW over a direct tunnel using a user portion of a GTPv1-U protocol as belonging to a session in response to the messages including at least one of: the first uplink UP TEId and IP address, or the first downlink UP TEId and IP address.

23 Claims, 6 Drawing Sheets

(56) References Cited

U.S. PATENT DOCUMENTS

| | | |
|---|---|---|
| 2005/0207420 A1* | 9/2005 | Shanklin et al. .............. 370/392 |
| 2009/0088147 A1 | 4/2009 | Bu et al. |
| 2009/0129342 A1* | 5/2009 | Hwang et al. ................ 370/331 |
| 2011/0032871 A1* | 2/2011 | Xu et al. ....................... 370/328 |
| 2011/0170517 A1 | 7/2011 | Bakker et al. |
| 2012/0063300 A1* | 3/2012 | Sahin et al. ................... 370/225 |
| 2012/0076120 A1 | 3/2012 | Kovvali et al. |
| 2012/0087260 A1 | 4/2012 | Devarapalli et al. |
| 2012/0106456 A1* | 5/2012 | Jin et al. ....................... 370/328 |
| 2012/0155324 A1* | 6/2012 | Janakiraman et al. ........ 370/254 |
| 2012/0300615 A1* | 11/2012 | Kempf et al. ................. 370/216 |
| 2014/0003233 A1* | 1/2014 | Rune et al. .................... 370/230 |

OTHER PUBLICATIONS

European Search Report mailed Jul. 26, 2013 in corresponding European Patent Application No. 13164031.0.

\* cited by examiner

SESSION-AWARE GTPV2 LOAD BALANCING

CROSS-REFERENCE TO RELATED APPLICATION

This application claims the benefit of the filing date of U.S. Provisional Patent Application No. 61/625,666 titled "Session-Aware GTPv2 Load Balancing" filed Apr. 17, 2012, the disclosure of which is hereby incorporated by reference herein in its entirety.

BACKGROUND

Mobile data networks continue to experience an unprecedented explosion in total traffic, particularly as new types of client devices (e.g., web-enabled smart phones, tablet devices, Internet-enabled TVs, gaming consoles, etc.) begin to consume larger amounts of bandwidth. Additionally, data speeds for network traffic can be as high as 100 Gigabit/second (Gb/s). Conventional network monitoring solutions typically have two components. First, one or more entities known as "probes" receive the totality of the network data and perform analysis and/or correlation of that entire data. Then, a server (or a cluster of servers) further aggregates the processed data and presents it to end-users.

As the inventors hereof have recognized, however, conventional monitoring cannot be easily scaled to meet the current traffic expansion. For most entities, analyzing 100% of their network traffic will soon become a cost-prohibitive undertaking. Accordingly, to address these and other issues, the inventors hereof have developed session-aware GTPv2 load balancing techniques that may be implemented, for example, to distribute monitored packet data across a plurality of analyzer devices.

SUMMARY

Embodiments of systems and methods for session-aware GTPv2 load balancing are described herein. In an illustrative, non-limiting embodiment, a method may include receiving a first and a second transaction between a Mobile Management Entity (MME) and a Serving Gateway (S-GW) over an S11 interface of a Long Term Evolution/Service Architecture Evolution (LTE/SAE) network using a control portion of a second version of a GPRS Tunneling Protocol (GTPv2-C), storing, in a memory, a first uplink user plane (UP) Tunnel Endpoint Identifier (TEId) and Internet Protocol (IP) address, a first downlink control plane (CP) TEId and IP address, and a first uplink CP TEId and IP address obtained from the first transaction, and a first downlink UP TEId and IP address obtained from the second transaction, and identifying one or more messages exchanged between an eNodeB and the S-GW over a direct tunnel using a user portion of a first version of the GTP protocol (GTPv1-U) as belonging to a given session in response to the one or more messages including at least one of: (i) the first uplink UP TEId and IP address, or (ii) the first downlink UP TEId and IP address.

In some implementations, the first transaction may include a create session request message transmitted from the MME to the S-GW and a corresponding create session response message transmitted from the S-GW to the MME. The method may also include determining that the create session response message is transmitted in response to the create session request message based, at least in part, upon a comparison between: (i) the downlink CP TEId obtained from the create session request, and (ii) a header TEId obtained from the create session response. For example, the second transaction may include a modify bearer request transmitted from the MME to the S-GW and a corresponding modify bearer response message transmitted from the S-GW to the MME. The method may also include determining that the modify bearer response message is transmitted in response to the modify bearer request message based, at least in part, upon a comparison between: (i) the downlink CP TEId obtained from the create session request, and (ii) a header TEId obtained from the modify bearer response. For example, the first downlink UP TEId may be a dynamically generated random number allocated to the given session, and wherein the first uplink UP TEId may be another dynamically generated random number allocated to the given session.

In some embodiments, the method may include receiving a third transaction between the MME and the Serving Gateway (S-GW) using the GTPv2-C, storing, in a memory, a second uplink UP TEId and IP address and a second downlink UP TEId and IP address obtained from the third transaction, and identifying one or more messages exchanged between the eNodeB and the S-GW over a direct tunnel using the GTPv1-U as belonging to the given session in response to the one or more messages including at least one of: (i) the second uplink UP TEId and IP address, or (ii) the second downlink UP TEId and IP address. For example, the third transaction may include a create bearer request transmitted from the MME to the S-GW and a corresponding create bearer response message transmitted from the S-GW to the MME configured to establish a dedicated bearer within the given session.

The method may include receiving a third and fourth transactions between the MME and the Serving Gateway (S-GW) using the GTPv2-C, storing, in a memory, a second uplink UP TEId and IP address obtained from the third transaction and a second downlink UP TEId and IP address obtained from the fourth transaction, and identifying one or more messages exchanged between the eNodeB and the S-GW over a direct tunnel using the GTPv1-U as belonging to the given session in response to the one or more messages including at least one of: (i) the second uplink UP TEId and IP address, or (ii) the second downlink UP TEId and IP address. In some cases, third transaction may include another create session request message transmitted from the MME to the S-GW and another corresponding create session response message transmitted from the S-GW to the MME, and the fourth transaction may include another modify bearer request transmitted from the MME to the S-GW and another corresponding modify bearer response message transmitted from the S-GW to the MME, the third and fourth transaction configured to establish an additional default bearer within the given session.

The method may also include receiving a third transaction between the MME and the Serving Gateway (S-GW) using the GTPv2-C and, in response to the third transaction being a delete session transaction, deleting one or more UP TEIds stored in the memory corresponding to a default bearer or a dedicated bearer. The method may further include transmitting each of the one or more messages to a selected one of a plurality of session analyzer devices as part of a load balancing operation.

In another illustrative, non-limiting embodiment, a monitoring probe may include a processor and a memory coupled to the processor, the memory configured to store program instructions executable by the processor to cause the monitoring probe to receive a create session transaction and a corresponding modify bearer transaction between a Mobile Management Entity (MME) and a Serving Gateway (S-GW) over an S11 interface of a Long Term Evolution/Service Architecture Evolution (LTE/SAE) network using a control portion of a second version of a GPRS Tunneling Protocol (GTPv2-C), store, in a memory, a first uplink user plane (UP) Tunnel Endpoint Identifier (TEId) and Internet Protocol (IP) address, a first downlink control plane (CP) TEId and IP address, and a first uplink CP TEId and IP address obtained from the create session transaction, and a first downlink UP TEId and IP address obtained from the modify bearer transaction, and identify one or more messages exchanged between an eNodeB and the S-GW over a direct tunnel using a user portion of a first version of the GTP protocol (GTPv1-U) as belonging to a given session in response to the one or more messages including at least one of: (i) the first uplink UP TEId and IP address, or (ii) the first downlink UP TEId and IP address.

In some embodiments, the program instructions may be executable by the processor to cause the telecommunications monitoring probe to receive a create bearer transaction between the MME and the S-GW using the GTPv2-C, store, in the memory, a second uplink UP TEId and IP address and a second downlink UP TEId and IP address obtained from the create bearer transaction, and identify one or more messages exchanged between the eNodeB and the S-GW over a direct tunnel using the GTPv1-U as belonging to the given session in response to the one or more messages including at least one of: (i) the second uplink UP TEId and IP address, or (ii) the second downlink UP TEId and IP address.

In other embodiments, the program instructions may be executable by the processor to cause the telecommunications monitoring probe to receive another create session transaction and another corresponding modify bearer transaction between the MME and the S-GW using the GTPv2-C, store, in the memory, a second uplink UP TEId and IP address obtained from the other create session transaction and a second downlink UP TEId and IP address obtained from the other modify bearer transaction, and identify one or more messages exchanged between the eNodeB and the S-GW over a direct tunnel using the GTPv1-U as belonging to the given session in response to the one or more messages including at least one of: (i) the second uplink UP TEId and IP address, or (ii) the second downlink UP TEId and IP address. The telecommunications monitoring may further transmit each of the one or more messages to a selected one of a plurality of session analyzer devices as part of a load balancing operation.

In yet another illustrative, non-limiting embodiment, a tangible computer-readable storage medium may have program instructions stored thereon that, upon execution by a processor within a computer system, cause the computer system to receive a modify bearer request transmitted from a Mobile Management Entity (MME) to a Serving Gateway (S-GW) over an S11 interface of a Long Term Evolution/Service Architecture Evolution (LTE/SAE) network using a control portion of a second version of a GPRS Tunneling Protocol (GTPv2-C), store, in a memory, a first downlink user plane (UP) Tunnel Endpoint Identifier (TEId) and Internet Protocol (IP) address and a first uplink control plane (CP) TEId and IP address obtained from the modify bearer request, identify a GTP header sequence number from the modify bearer request, receive a modify bearer response transmitted from the S-GW to the MME using the GTP-C, match the modify bearer response to the modify bearer request based, at least in part, upon the GTP header sequence number, store, in the memory, a first downlink CP TEId and IP address and a first uplink UP TEId and IP address obtained from the modify bearer response, and identify one or more messages exchanged between the MME and the S-GW using a user portion of the GTP (GTP-U) as belonging to a given session in response to the one or more messages including at least one of: (i) the first downlink UP TEId and IP address, or (ii) the first uplink UP TEId and IP address.

To match the modify bearer response to the modify bearer request, the program instructions, upon execution by the processor, may further cause the computer system to match a source IP address of the modify bearer request to a destination IP address of the modify bearer response and/or to match a destination IP address of the modify bearer request to a source IP address of the modify bearer response. The program instructions, upon execution by the processor, may further cause the computer system to transmit each of the one or more messages to a selected one of a plurality of session analyzer devices as part of a load balancing operation.

In some embodiments, one or more of the methods described herein may be performed by one or more computer systems. In other embodiments, a tangible computer-readable storage medium may have program instructions stored thereon that, upon execution by one or more computer systems, cause the one or more computer systems to perform one or more operations disclosed herein. In yet other embodiments, a system may include at least one processor and a memory coupled to the at least one processor, the memory configured to store program instructions executable by the at least one processor to perform one or more operations disclosed herein.

BRIEF DESCRIPTION OF THE DRAWINGS

Reference will now be made to the accompanying drawings, where.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Figure 1:
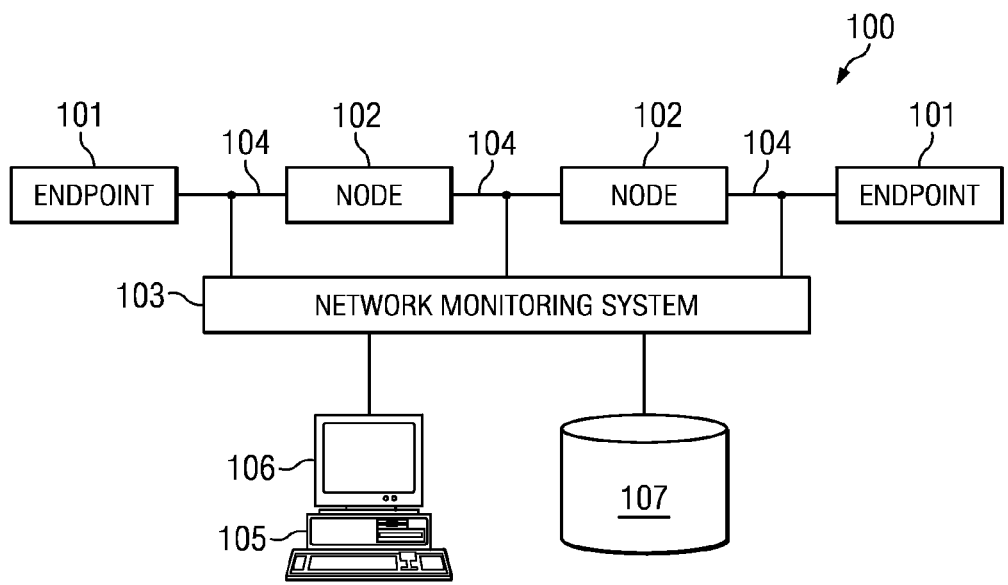
FIG. 1 is a block diagram of a network monitoring environment according to some embodiments.

FIG. 1 illustrates a block diagram of a network monitoring environment according to some embodiments. Particularly, telecommunications network 100 includes network nodes 102 and endpoints 101. For example, network 100 may include a wireless broadband network, a 3G network, a 4G network, a 3GPP Long Term Evolution (LTE) network, a voice-over-IP (VoIP) network, an IP Multimedia Subsystem (IMS) network, etc. Although only two nodes 102 and two endpoints 102 are shown in FIG. 1, it will be understood that network 100 may comprise any number of nodes 102 and endpoints 101. Moreover, it will be understood that the nodes 102 and endpoints 101 in network 100 may be interconnected in any suitable manner, including being coupled to one or more other nodes 102 and/or endpoints 101.

In some implementations, endpoints 101 may represent, for example, computers, mobile devices, user equipment (UE), client applications, server applications, or the like. Meanwhile, nodes 102 may be components in an intranet, Internet, or public data network, such as a router or gateway. Nodes 102 may also be components in a 3G or 4G wireless network, such as a Serving GPRS Support Node (SGSN), Gateway GPRS Support Node (GGSN) or Border Gateway in a General Packet Radio Service (GPRS) network, Packet Data Serving Node (PDSN) in a CDMA2000 network, a Mobile Management Entity (MME) in a Long Term Evolution/Service Architecture Evolution (LTE/SAE) network or any other core network nodes or routers that transfer data packets or messages between endpoints 101.

Many packets traverse links 104 and nodes 102, as data is exchanged between endpoints 101. These packets may represent many different sessions and protocols. For example, if endpoint 101 is used for a voice or video call, then it may exchange Voice over Internet Protocol (VoIP) or Session Initiation Protocol (SIP) data packets with a SIP/VoIP server (i.e., the other endpoint 101) using Real-Time Transport Protocol (RTP). If endpoint 101 is used to send or retrieve email, device 102 may exchange Internet Message Access Protocol (IMAP), Post Office Protocol 3 Protocol (POP3), or Simple Mail Transfer Protocol (SMTP) messages with an email server (i.e., the other endpoint 101). If endpoint 101 is used to download or stream video, device 101 may use Real Time Streaming Protocol (RTSP) to establish and control media sessions with a video server (i.e., the other endpoint 101). Alternatively, the user at endpoint 101 may access a number of websites using Hypertext Transfer Protocol (HTTP) to exchange data packets with a web server (i.e., the other endpoint 101). It will be understood that packets exchanged between devices 101 may conform to numerous other protocols now known or later developed.

In a typical situation, approximately one percent of the packets traversing network 100 carry control data, such as information for setting-up, managing or tearing-down calls or sessions between endpoints 101. The other ninety-nine percent of the packets carry user data, such as actual voice, video, email or information content to and from devices 101.

Hierarchical network monitoring system 103 may be used to monitor the performance of network 100. Monitoring system 103 captures packets that are transported across links or interfaces 104 between nodes 102, endpoints 101, and/or any other network links or connections (not shown). In some embodiments, packet capture devices may be non-intrusively coupled to network links 104 to capture substantially all of the packets transmitted across the links. Although only three links 104 are shown in FIG. 1, it will be understood that in an actual network there may be dozens or hundreds of physical, logical or virtual connections and links between network nodes. In some cases, network monitoring system 103 may be coupled to all or a high percentage of these links. In other embodiments, monitoring system 103 may be coupled only to a portion of network 100, such as only to links associated with a particular carrier or service provider. The packet capture devices may be part of network monitoring system 103, such as a line interface card, or may be separate components that are remotely coupled to network monitoring system 103 from different locations.

Monitoring system 103 may include one or more processors running one or more software applications that collect, correlate and/or analyze media and signaling data packets from network 100. Monitoring system 103 may incorporate protocol analyzer, session analyzer, and/or traffic analyzer functionality that provides OSI (Open Systems Interconnection) Layer 2 to Layer 7 troubleshooting by characterizing IP traffic by links, nodes, applications and servers on network 100. In some embodiments, these operations may be provided, for example, by the IRIS® toolset available from Tektronix, Inc., although other suitable tools may exist or be later developed. The packet capture devices coupling network monitoring system 103 to links 104 may be high-speed, high-density 10GE probes that are optimized to handle high bandwidth IP traffic, such as the GEOPROBE® G10, also available from Tektronix, Inc., although other suitable tools may exist or be later developed. A service provider or network operator may access data from monitoring system 103 via user interface station 105 having a display or graphical user interface 106, such as the IRISVIEW configurable software framework that provides a single, integrated platform for several applications, including feeds to customer experience management systems and operation support system (OSS) and business support system (BSS) applications, which is also available from Tektronix, Inc., although other suitable tools may exist or be later developed.

Monitoring system 103 may further comprise internal or external memory 107 for storing captured data packets, user session data, and configuration information. Monitoring system 103 may capture and correlate the packets associated specific data sessions on links 104. In some embodiments, related packets can be correlated and combined into a record for a particular flow, session or call on network 100. These data packets or messages may be captured in capture files. A call trace application may be used to categorize messages into calls and to create Call Detail Records (CDRs). These calls may belong to scenarios that are based on or defined by the underlying network. In an illustrative, non-limiting example, related packets can be correlated using a 5-tuple association mechanism. Such a 5-tuple association process may use an IP correlation key that includes 5 parts: server IP address, client IP address, source port, destination port, and Layer 4 Protocol (Transmission Control Protocol (TCP), User Datagram Protocol (UDP) or Stream Control Transmission Protocol (SCTP)).

Accordingly, hierarchical network monitoring system 103 may be configured to sample (e.g., unobtrusively) related data packets for a communication session in order to track the same set of user experience information for each session and each client without regard to the protocol (e.g., HTTP, RTMP, RTP, etc.) used to support the session. For example, monitoring system 103 may be capable of identifying certain information about each user's experience, as described in more detail below. A service provider may use this information, for instance, to adjust network services available to endpoints 101 such as the bandwidth assigned to each user, and the routing of data packets through network 100.

As the capability of network 100 increases toward 10GE and beyond (e.g., 100GE), however, each link 104 supports more users' flows and sessions. In some embodiments, link 104 may be a 10GE or a collection of 10GE links (e.g., one or more 100GE links) supporting thousands or tens of thousands of users or subscribers. Many of the subscribers may have multiple active sessions, which may result in an astronomical number of active flows on link 104 at any time where each flow includes many packets. With such a very large volume of packets, it becomes difficult for a service provider or network operator to analyze all the traffic across network 100, for example, to identify problem nodes or links.

Figure 2:
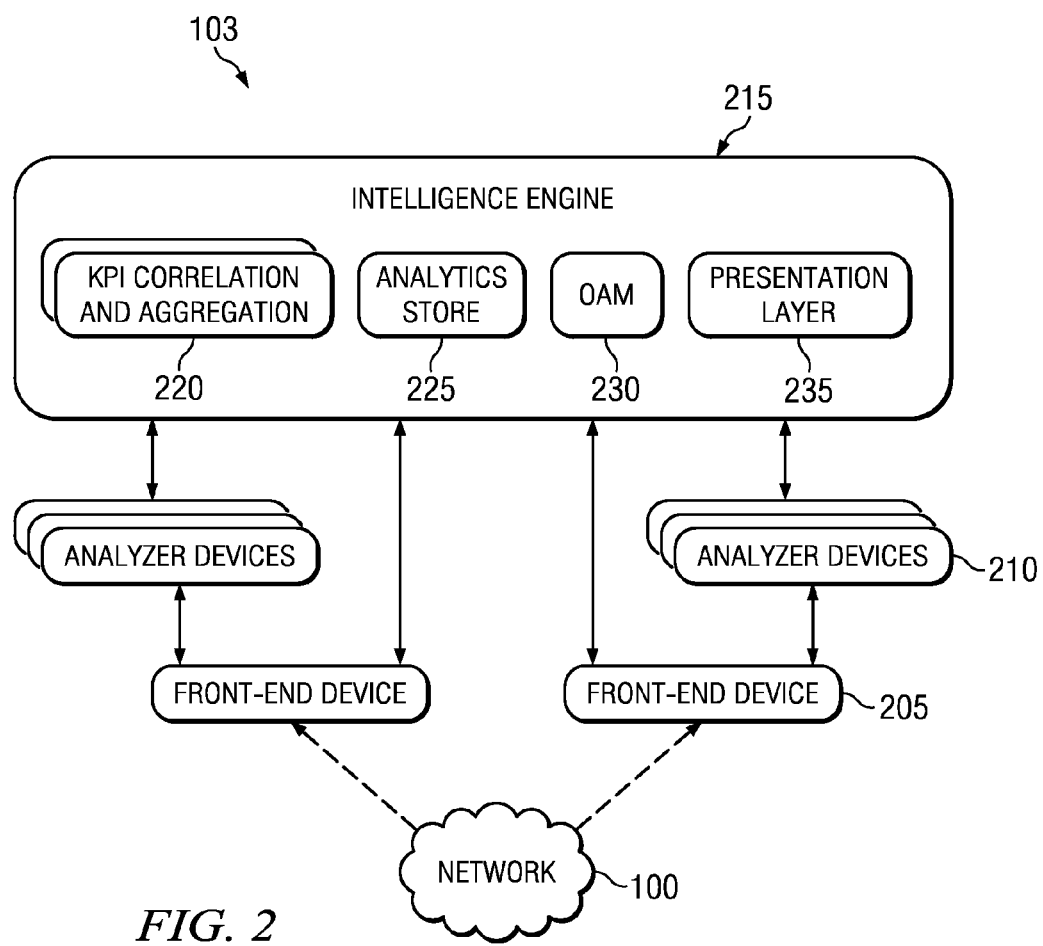
FIG. 2 is a block diagram of a hierarchical network monitoring system according to some embodiments.

To address these and other concerns, various systems and methods described herein may enable an intelligent and scalable network monitoring using a hierarchy of devices. Hence, FIG. 2 illustrates hierarchical network monitoring system 103 according to some embodiments. As shown, one or more front-end monitoring devices or probes 205 (i.e., a first tier of a three-tiered architecture) may be coupled to network 100. Each of front-end devices 205 may also be coupled to one or more network analyzer devices 210 (i.e., a second tier), which in turn may be coupled to intelligence engine 215 (i.e., a third tier). Front-end devices 205 may also be directly coupled to intelligence engine 215, as described in more detail below. Typically, front-end devices 205 may be capable or configured to process data at rates that are higher (e.g., about 10 or 100 times) than analyzers 210. Although the system of FIG. 2 is shown as a three-tier architecture, it should be understood by a person of ordinary skill in the art in light of this disclosure that the principles and techniques discussed herein may be extended to a larger number of tiers (e.g., a four-tiered architecture).

Generally speaking, front-end devices 205 may passively tap into network 100 and monitor all or substantially of its data. For example, such one or more of front-end devices 205 may be coupled to one or more links 104 of network 100 shown in FIG. 1. Meanwhile, analyzer devices 210 may receive and analyze a subset of the traffic that is of interest, as defined by one or more rules. Intelligence engine 215 may include a plurality of distributed components configured to perform further analysis and presentation of data to users. For example, intelligence engine may include Key Performance Indicator (KPI) correlation and aggregation module 220; analytics store 225; Operation, Administration, and Maintenance (OAM) module 230; and presentation layer 235.

In some embodiments, front-end devices 205 may be configured to monitor all of the network traffic that it is tapped into (e.g., 10GE, 100GE, etc.). Front-end devices 205 may also be configured to intelligently distribute traffic based on a user session level. Additionally or alternatively, front-end devices 205 may distribute traffic based on a transport layer level. In some cases, each device 205 may analyze traffic intelligently to distinguish high-value traffic from low-value traffic based on a set of heuristics. Examples of such heuristics may include, but are not limited to, a customer list (e.g., mobile subscriber identifiers (IMSI), phone numbers, etc.), traffic content, or a combination thereof. Therefore, in some implementations, front-end devices 205 may feed higher-valued traffic to a more sophisticated one of analyzers 210 and lower-valued traffic to a less sophisticated one of analyzers 210 (to provide at least some rudimentary information).

Front-end devices 205 may also be configured to aggregate data to enable backhauling, to generate netflows and basic KPI calculations, time stamping of data, port stamping of data, filtering out unwanted data, protocol classification, and deep packet inspection (DPI) analysis. In addition, front-end devices 205 may be configured to distribute data to the back-end monitoring tools (e.g., analyzers 210 and/or intelligence engine 215) in a variety of ways, which may include flow based or user session based balancing. Devices 205 may also receive dynamic load information (e.g., namely CPU and memory utilization) from each of analyzer devices 210 so to enable intelligent distribution of data. These, and other features, are described in more detail in connection with FIGS. 3-6 below.

Analyzer devices 210 may be configured to passively monitor a subset of the traffic that has been forwarded to it by the front-end device(s) 205. Analyzer devices 210 may also be configured to perform stateful analysis of data, extraction of key parameters for call correlation and generation of call data records (CDRs), application specific processing, computation of application specific KPIs, and communication with intelligence engine 215 for retrieval of KPIs (e.g., in real-time and/or historical mode). In addition, analyzer devices 210 may be configured to notify front-end device(s) 205 regarding its CPU and/or memory utilization so that front-end device(s) 205 can utilize this information to intelligently distribute traffic.

Intelligence engine 215 may follow a distributed and scalable architecture. In some embodiments, module 220 may receive KPI and may correlate information from front-end and analyzer devices 205 and 210, respectively. OAM module 230 may be used to configure and/or control front-end device 205 and analyzer devices 210, distribute software or firmware upgrades, etc. Presentation layer 235 may be configured to present KPI and other relevant information to the end-users. Analytics store 225 may include a storage or database for the storage of analytics data or the like.

In some implementations, analyzer devices 210 and/or intelligence engine 215 may be hosted at an offsite location (i.e., at a different physical location remote from front-end devices 205). Additionally or alternatively, analyzer devices 210 and/or intelligence engine 215 may be hosted in a cloud environment.

Figure 3:
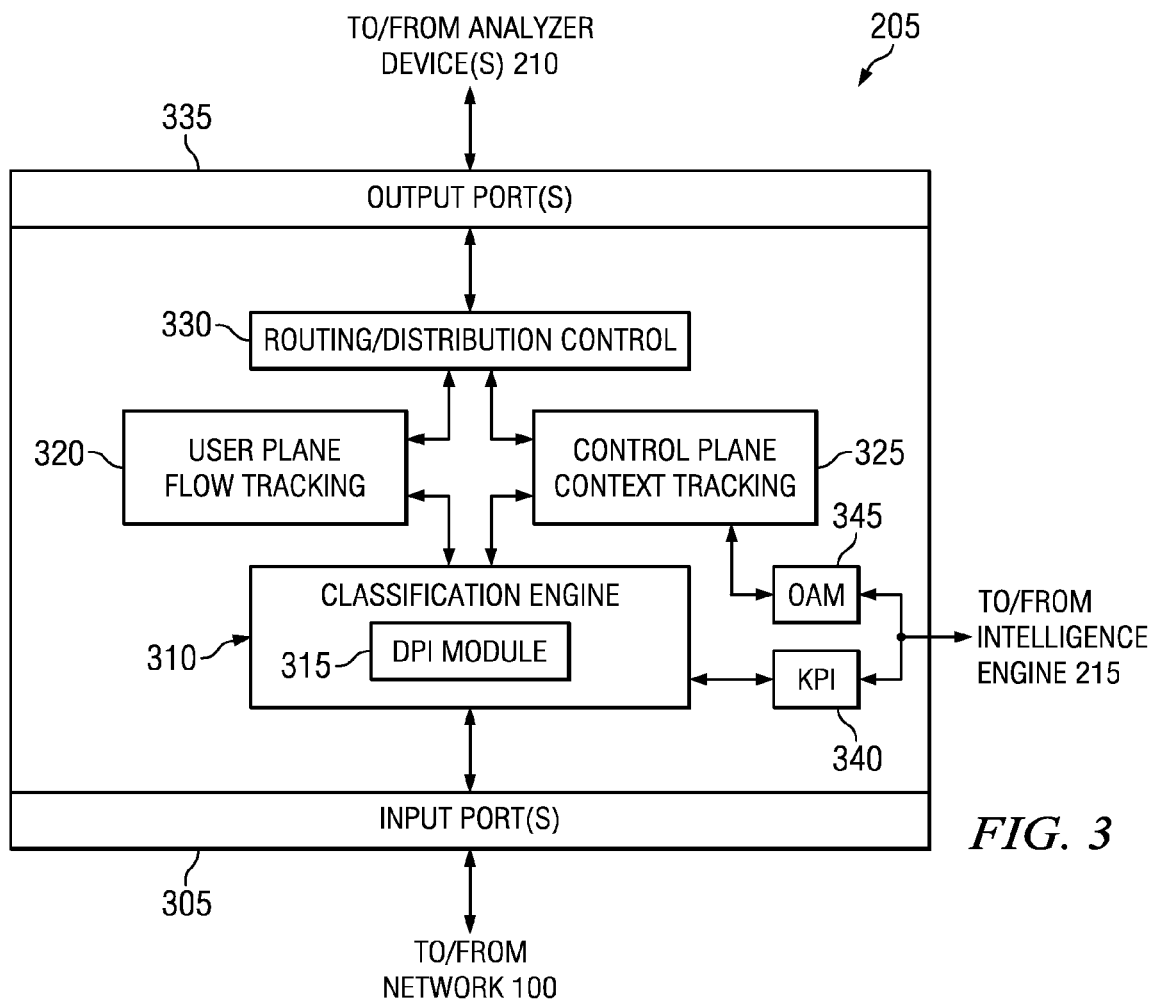
FIG. 3 is a block diagram of a front-end monitoring probe according to some embodiments.

FIG. 3 is a block diagram of front-end monitoring probe 205 according to some embodiments. Input port(s) 305 (e.g., 8, 40, or 100 Gb/s) may be coupled to network 100 and to classification engine 310, which may include DPI module 315. Classification engine 310 may be coupled to user plane (UP) flow tracking module 320 and to control plane (CP) context tracking module 325, which may be coupled to routing/distribution control engine 330. Routing engine 330 may be coupled to output port(s), which in turn may be coupled to one or more analyzer devices 210. In some embodiments, KPI module 340 and OAM module 345 may also be coupled to classification engine 310 and/or tracking modules 320/325, as well as to intelligence engine 215.

As shown in FIG. 3, front-end probe or device 205 may be configured to receive traffic from network 100, for example, at a first data rate (e.g., 10 Gb/s, 100 Gb/s, etc.), and to transmit selected portions of that traffic to one or more analyzers 210, for example, at a second data rate (typically smaller than the first data rate). Classification engine 310 may identify user sessions, types of content, transport protocols, etc. (e.g., using DPI module 315) and transfer UP packets to flow tracking module 320 and CP packets to context tracking module 325. In some implementations, classification engine 310 may implement one or more rules to allow it to distinguish high-value traffic from low-value traffic and to label processed packets accordingly. Routing/distribution control engine 330 may implement one or more load balancing or distribution operations, for example, to transfer high-value traffic to a first analyzer and low-value traffic to a second analyzer. Moreover, KPI module 340 may perform basic KPI operations to obtain metrics such as, for example, bandwidth statistics (e.g., per port), physical frame/packet errors, protocol distribution, etc.

OAM module 345 of front-end device 205 may be coupled to OAM module 230 of intelligence engine 215 and may receive control and administration commands, such as, for example, rules that allow classification engine 310 to identify particular types of traffic. For example, based on these rules, classification engine 310 may be configured to identify and/or parse traffic by user session (e.g., IMEI, IP address, phone number, etc.). In some cases, classification engine 310 may be session context aware (e.g., web browsing, protocol specific, etc.). Further, front-end device 205 may be SCTP connection aware to ensure, for example, that all packets from a same connection are routed to the same one of analyzers 210.

In operation, front-end device 205 may be configured to perform selective monitoring operations—i.e., to identify and track only selected traffic (or types of traffic) such as, for example, high-value traffic. In those cases, only high-value traffic may be sent to analyzer(s) 210 (although all traffic may receive basic processing at the front-end device such as, for example, basic KPI metrics). Additionally or alternatively, front-end device 205 may be configured to target high-value traffic to a particular analyzer (or set of analyzers) 210, and to transmit low-value traffic to another analyzer (or set of analyzers) 210. This may allow, for instance, for more expensive analyzers to be used only (or mostly) for high-value traffic and inexpensive analyzers to be used for low-value traffic. Additionally or alternatively, front-end device 205 may perform load-balancing operations for all (or a selected portion) of the traffic among two or more analyzers 210.

In various embodiments, blocks 305-345 may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Figure 4:
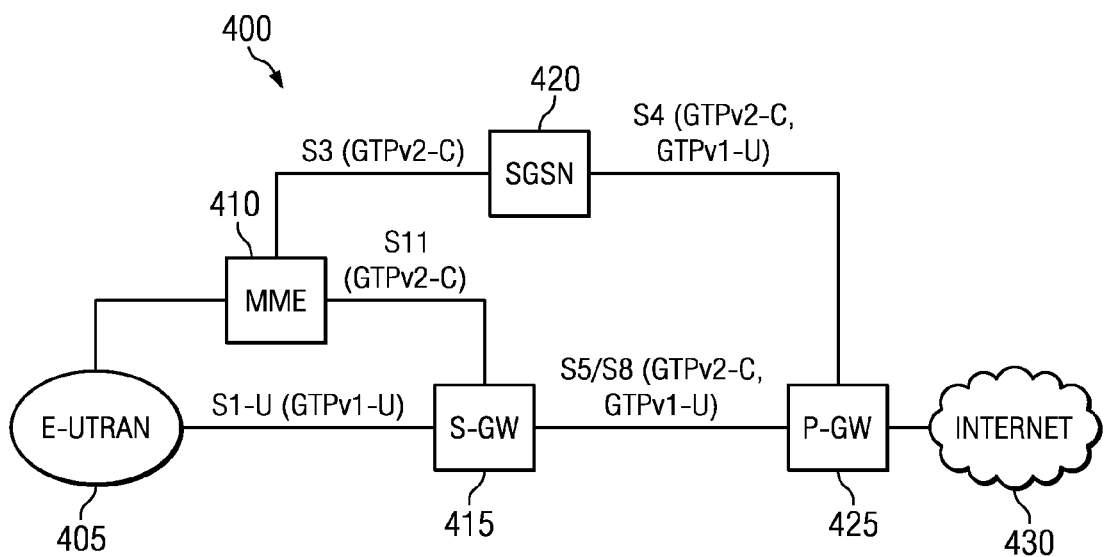
FIG. 4 is a block diagram of an LTE network where a front-end monitoring probe may be deployed according to some embodiments.

FIG. 4 is a block diagram of LTE/SAE network 400 where front-end monitoring probe 205 may be deployed according to some embodiments. Particularly, Evolved Universal Terrestrial Radio Access Network (E-UTRAN) 405 may include one or more Evolved Base Transceiver Stations or the like (eNodeBs) to facilitate wireless communications (e.g., to and/or from endpoints 101 in FIG. 1). E-UTRAN 405 is coupled to MME 410 and to Serving Gateway (S-GW) 415 via an S1-U interface using the first version of the GPRS Tunneling Protocol (GTPv1-U). Here it is appropriate to note that different versions of the GTP protocol exist today. For example, the packet header fields and contents of GTPv2 are different from those of GTPv1.

MME 410 is coupled to SGSN 420 via an S3 interface using a control portion of the second version of the GTP protocol (GTPv2-C), as well as to S-GW 415 via an S11 interface using the same GTPv2-C protocol. SGSN 420 is coupled to Packet Data Network (PDN) Gateway (P-GW) 425 via an S4 interface using both the GTPv2-C (for control messages) and GTPv1-U (for data traffic) protocols. S-GW 415 is coupled to P-GW 425 via S5 and/or S8 interfaces, also using the GTPv2-C and GTPv1-U protocols. Finally, P-GW 425 is coupled to another network, such as, for example the Internet 430.

In operation, MME 410 and S-GW 415 may communicate with each other to establish, manage, and terminate user sessions using control-plane (CP) messages under the GTPv2-C protocol. Examples of CP messages include, but are not limited to: create session requests and responses, modify bearer requests and responses, delete session requests and responses, etc. Once a session is established, user-plane (UP) messages (e.g., any other data messages) may then be transmitted via one or more direct tunnels between E-UTRAN 405 (e.g., an eNodeB) and S-GW 415 using the GTPv1-U protocol.

Typically, MME 410 sends a create session request to S-GW 415 in order to initiate a session (upon receipt of a corresponding create session response) and to establish control-plane (CP) Tunnel Endpoint Identifiers (F-TEIds, which are dynamically generated random numbers) in the uplink (i.e., from MME 410 to S-GW 415) and downlink (i.e., from S-GW 415 to MME 410) directions, as well as uplink user-plane (UP) TEId (referred to as "Fully-Qualified" or "F-TEId" in GTPv2). A subsequent modify bearer request and response are established the downlink UP F-TEId identifier, thus completing a direct tunnel bearer between eNodeB 405 and S-GW 415. In some situations, the modify bearer transaction may also change the downlink CP TEId identifiers. Moreover, a similar message flow may also take place in the S5, S8, and/or S4 interfaces.

In some cases, each session may establish additional default bearers through additional create session request/response transactions. These are identified by a non-zero GTP header TEId in the create session request message, which specifies the Bearer ID to uniquely identify the new bearer. In addition, dedicated bearers may be created to correspond with each default bearer. These are initiated through a create bearer request from S-GW 415 to MME 410, but a Bearer ID is not assigned for this new bearer until MME 410 responds with a create bearer response message.

Default bearers are released by a delete session request/response transaction initiated by S-GW 415. The Bearer ID in the request message indicates which default bearer is being deleted. Deletion of the default bearer also triggers release of all associated dedicated bearers. Dedicated bearers may be released individually by a delete bearer request/response transaction. Moreover, session teardown may be identified by release of all default bearers through their own delete session request/response transactions. TEIds (or F-TEIds for GTPv2) may be allocated independently by each node in the network. An individual value may be used in parallel by several different nodes, and each node may re-use a tunnel identifier as soon as it is released by an existing session.

In some embodiments, front-end probe 205 of FIG. 2 may be disposed within LTE/SAE network 400 in a manner such that it may monitor S11 and/or direct tunnel traffic. For instance, front-end probe 205 may be co-located (or otherwise implemented as a part of) S-GW 415 and configured to intelligently split and/or duplicate traffic across analyzer devices 210. For example, in some cases, packets belonging to a first session (e.g., control and/or data packets) may be sent to a first one of analyzer devices 210, packets belonging to a second session may be sent to a second one of analyzer devices 210, and so on.

Generally speaking, associating each PDU with a specific session allows for splitting of a large LTE traffic volume down to manageable segments without requiring upper layer monitoring devices (e.g., devices 210) to re-construct sessions in real-time. Front-end probe 205 may serve as a session-aware load-balancer distributing complete sessions to independent monitoring systems, where sessions can be mapped to individual mobile subscribers. To this end, front-end probe 205 may monitor GTP-C tunnel management messages of a session and extract the necessary UP identifiers for correlation with UP traffic.

In some embodiments, TEId and endpoint address (e.g., IP address) pairs may be maintained for both uplink and downlink directions of the CP. Front-end probe 205 may also maintain TEId and endpoint address pairs for both uplink and downlink directions of each user-plane bearer associated with the session. Front-end probe 205 may also maintain a list of dedicated bearer Ids associated with each default bearer Id. Then, front-end probe 205 may track the success, failure, or timeout of each transaction within the session to catch tunnel identifier and endpoint address changes. Once sessions are identified by front-end probe 205, a decision can be made for example, to proceed with full monitoring of a subscriber, summarize the content per subscriber, or ignore the subscriber session completely. Full monitoring of a given session may be accomplished by distributing all CP and UP PDUs associated with an individual session upwards to a single session analyzer device (e.g., a selected one of devices 210). Stateful monitoring of the link or device utilization onwards in the monitoring may also allow for per-session throttling.

Teardown of a session within front-end probe 205 may be triggered by either monitoring of a teardown indication within the GTP-C signaling for that session or excessive idle-time on both the control-plane and user-plane paths of a session. Once session teardown is triggered, the TEId and endpoint address pairs may be retained for a short time to correlate response messages, delayed message, or retransmissions. However, TEIds can be reused immediately upon release by the owning node. For example, to validate matches as legitimate, front-end probe 205 may determine that the matched session is not be in the process of teardown and/or that, if the message contains an International Mobile Subscriber Identity (IMSI) value, then the matched session also contain a matching IMSI value.

In some embodiments, both front-end probe 205 and session analyzer devices 210 may perform some sort of session-level processing. To enable both devices to stay in synchronization with each other, they may communicate through metadata within the packets and/or out-of-band messaging. Typically, session analyzer device 210 may be notified of new session detection, session teardown, and/or abort of a presently active session (overload or tunnel identifier re-use, for example). An identifier allocated on the front-end probe 205 may also also included in the metadata and/or out-of-band messaging to keep both devices in sync and to assist session analyzer devices 210 in starting detailed analysis.

Figure 5:
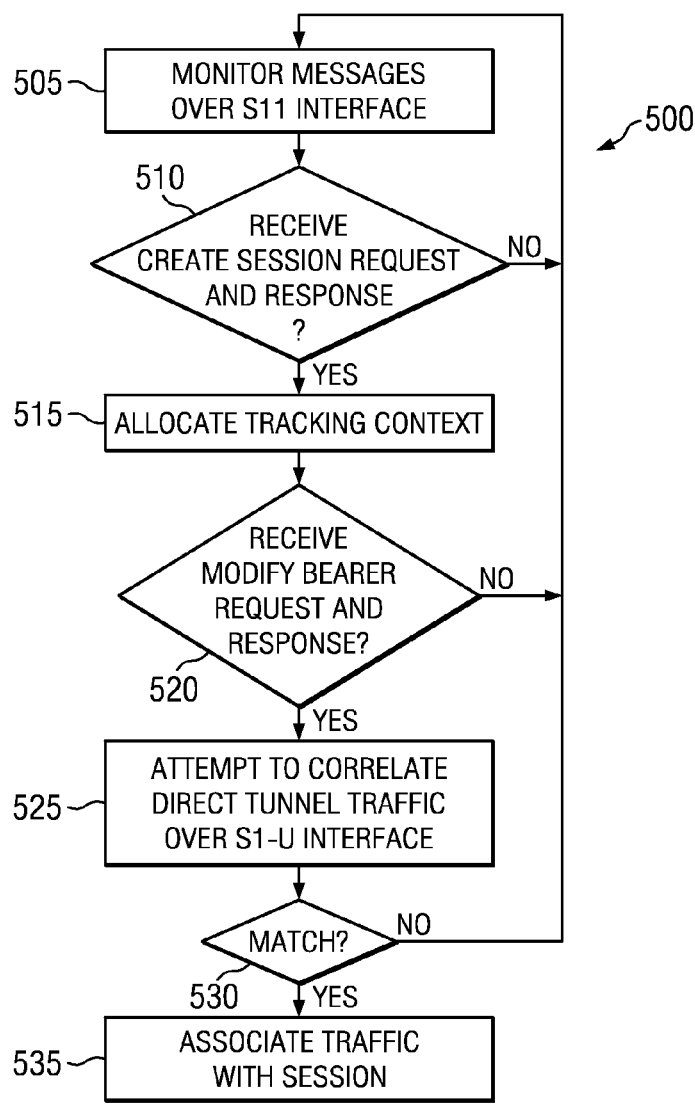
FIG. 5 is a flowchart of a method of identifying one or more sessions according to some embodiments.

To further illustrate the foregoing, FIG. 5 is a flowchart of method 500 of identifying one or more sessions. In some embodiments, method 500 may be performed, at least in part, by elements 310-330 of front-end probe 205 in FIG. 3, for example, to enable one or more session-based load balancing operations. As shown, block 505 monitors and/or samples messages exchanged over the S11 interface of LTE/SAE network 400 (i.e., between MME 410 and S-GW 415). At block 510, method 500 determines whether sampled messages include a corresponding create session request and response, and extracts one or more identifiers. It not, control returns to block 505. Otherwise, at block 515, method 500 allocates a tracking context memory to a potential session. At block 520, method 500 determines whether the sampled messages include a corresponding modify bearer request and response, and extracts one or more additional identifiers. If not, control returns to block 505. Otherwise, at block 525, method 500 attempts to correlate the direct tunnel traffic (i.e., between E-UTRAN 405 and S-GW 415) with identifiers extracted at blocks 510 and 520. If there is a match at block 530, then at block 535 messages having the same identifiers as those stored in the tracking context memory may be designated as belonging to that corresponding session.

Figure 6:
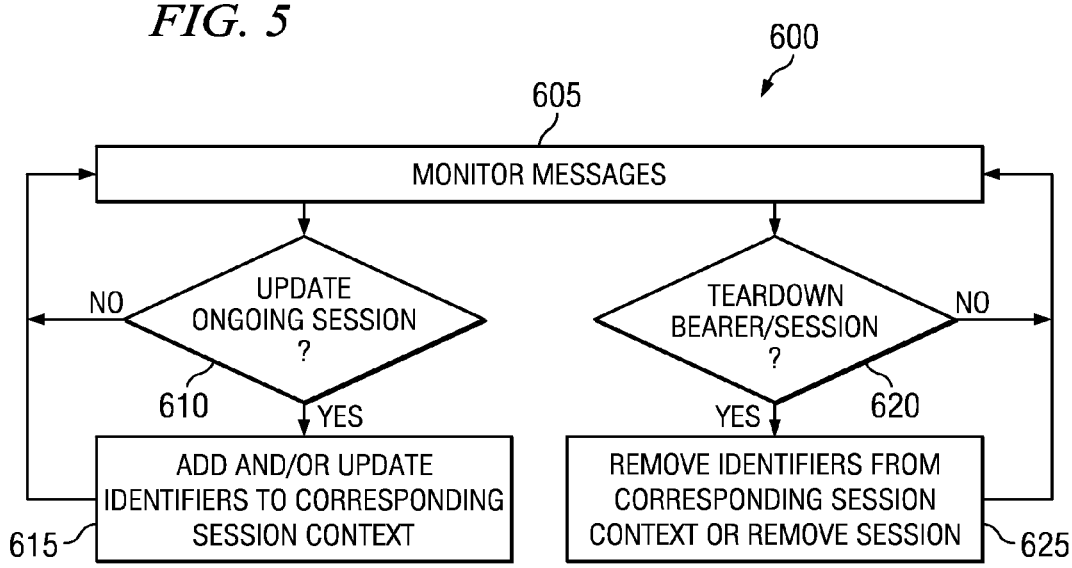
FIG. 6 is a flowchart of a method of updating one or more sessions according to some embodiments.

FIG. 6 is a flowchart of method 600 of updating one or more sessions. Again, method 600 may be performed, at least in part, by elements 310-330 of front-end probe 205 in FIG. 3, for example, to further enable one or more session-based load balancing operations. At block 605, method 600 monitors and/or samples messages exchanged over the S11 interface of LTE/SAE network 400 (i.e., between MME 410 and S-GW 415). At block 610, method 600 determines whether sampled messages constitute additional create session and/or modify bearer transactions for existing sessions (i.e., sessions for which identifiers are stored in corresponding tracking context memories). If so, then at block 615 method 600 may add and/or update identifiers of respective sessions, for example, to include additional default and/or dedicated bearers; otherwise control returns to block 605. At block 620, method 600 determines whether sampled messages constitute delete bearer or session transactions corresponding to ongoing bearers and/or sessions. If so, then at block 625 method 600 removes identifiers from corresponding sessions and/or deletes the sessions altogether.

It should be understood that the various operations described herein, particularly in connection with FIGS. 5 and 6, may be implemented in software, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

Figure 7A:
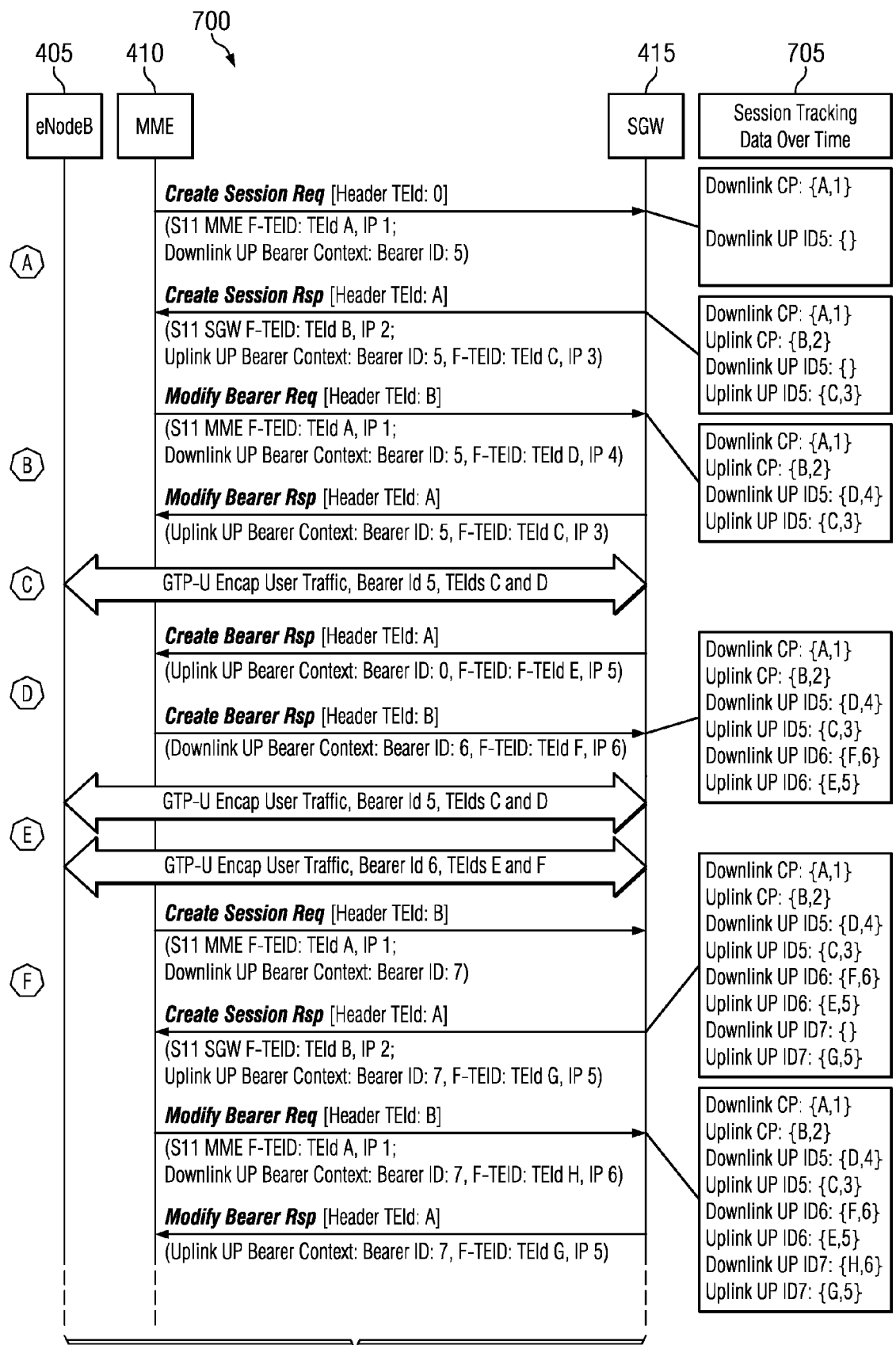
FIG. 7 is a diagram illustrating a non-limiting example of session identification and updating techniques according to some embodiments.
Figure 7B:
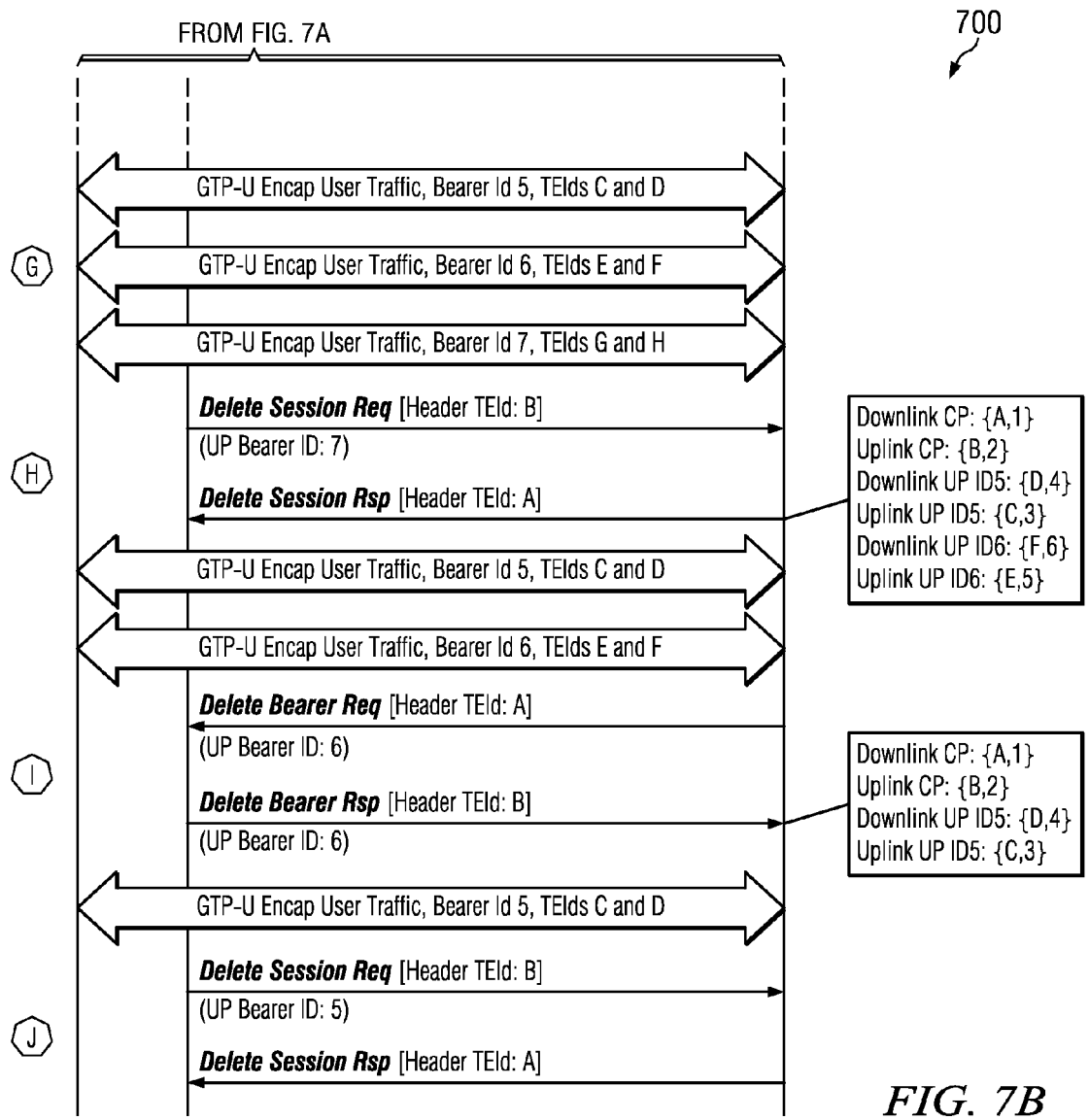

FIG. 7 shows diagram 700 illustrating a non-limiting example of session identification and updating techniques. In some embodiments, column 705 represents some of the contents of a context or session memory allocated to a given session. Moreover, for each message, parameters in brackets are GTPv1 or GTPv2 header values, and parameters in parenthesis are message contents or information elements. In message exchange A, upon reception of a create session request message with header TEId of "0," a new tracking context is allocated and a downlink CP lookup entry is created; {A,1} in this example. When the corresponding create session response message is received, it is correlated with the previously allocated session by lookup with the header TEId of "A" and the destination IP address of "1." Completion of this transaction adds uplink look entries {B,2} and {C,3} to 705.

In message exchange B, a modify bearer transaction establishes the downlink UP lookup entry with {D,4}. The session now has one user-plane bearer with Bearer ID "5." In message exchange C, user-plane traffic in either direction may be correlated with the session based on the lookups created in exchanges A and B. In this instance, {C,3} or {D,4}. In message exchange D, a dedicated bearer is created with ID "6," thus adding lookup entries {E,5} and [F,6] to 705. In message exchange E, user-plane traffic in either direction for both bearers "5" and "6" may be correlated with the session based on the lookups created in exchanges A, B, and D. In this instance, {C,3}, {D,4}, {E,5}, and {F,6}.

In message exchange F, an additional default bearer is created through a create session and modify bearer transactions resulting in new lookups for ID "7" of {H,6} and {G,5} in 705. In message exchange G, user-plane traffic in either direction for both bearers "5," "6," and "7" may be correlated with the session based on the lookups created in exchanges A, B, D, and F. At this point, {C,3}, {D,4}, {E,5}, {F,6}, {G,5}, and {H,6} are in 705. In message exchange H, the newly created default bearer, ID "7," is deleted by a delete session transaction. In message exchange I, the dedicated bearer from exchange D is deleted by a delete bearer transaction. The remaining user-plane lookup entries in 705 are {C,3} and {D,6}. In message exchange J, a delete session transaction now deletes the original default bearer, ID "5." Because this is the last default bearer, the session is now flagged for teardown. The CP lookup entries may be retained for a short period of time to catch any retransmitted messages before all resources are released.

In some embodiments, exceptions may be handled through additional tracking of individual transactions when a full session is not created or detected. In these cases, the TEId and IP address pairs in each direction cannot ordinarily be correlated together as described in the example of FIG. 7. Instead, end-point IP addresses, the GTPv1 header sequence number, and the GTPv1 header message Id may correlate a single request/response pair and hence build the downlink plus uplink correlation.

Figure 8:
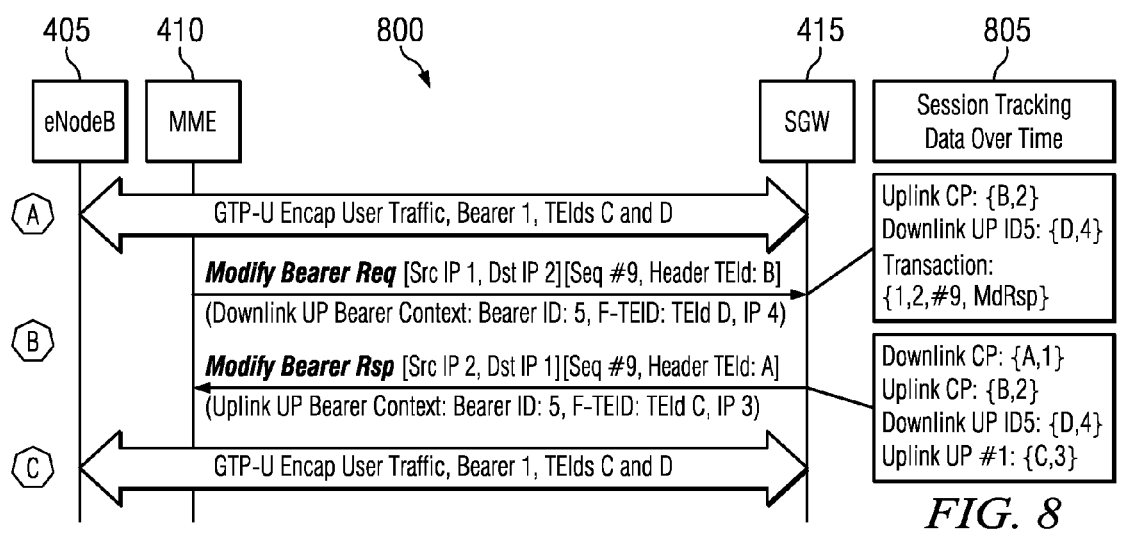
FIG. 8 is a diagram illustrating a non-limiting example of exception handling techniques according to some embodiments.

FIG. 8 shows diagram 800 illustrating a non-limiting example of an exception handling technique. Particularly, diagram 800 illustrates a scenario in which the create session transaction was missed by front-end probe 205 due to network or monitoring equipment conditions. Similarly as above, column 805 represents some of the contents of a context or session memory allocated to a given session.

In message exchange A, user-plane traffic seen without previously monitored control-plane traffic cannot ordinarily be correlated as belonging to a session. In message exchange B, the modify bearer request message cannot be correlated to an existing session because the create session transaction was not seen or otherwise fully processed. Nonetheless, the uplink CP TEId and IP address may be inferred by the GTP header TEId and destination IP address. The downlink UP attributes are included within the request message payload, {D,4}, but there is no information in this PDU regarding the downlink CP attributes or uplink UP attributes. By independently tracking the GTP header sequence number for these unmatched messages {1, 2, #9}, however, front-end probe 205 may correlate the modify bearer response with the initial request to add downlink CP {A,1} and uplink UP {C,3} attributes to the session. In message exchange C, the session is now "fully tracked" so that further user-plane data may be load-balanced along with the control-plane PDUs upwards into analyzer devices 210.

In some embodiments, transactions that do not match a session until the second message (usually response) is received may be "joined" with the original session. In some implementations, this may involve a cleanup, both locally and with session analyzer devices 210, of a tentative or "garbage session" created before the match occurred and re-transmission of the packets processed before the final match. Sessions may be created upon completion of successful transactions and deleted whenever a request to delete that last default bearer is received.

Figure 9:
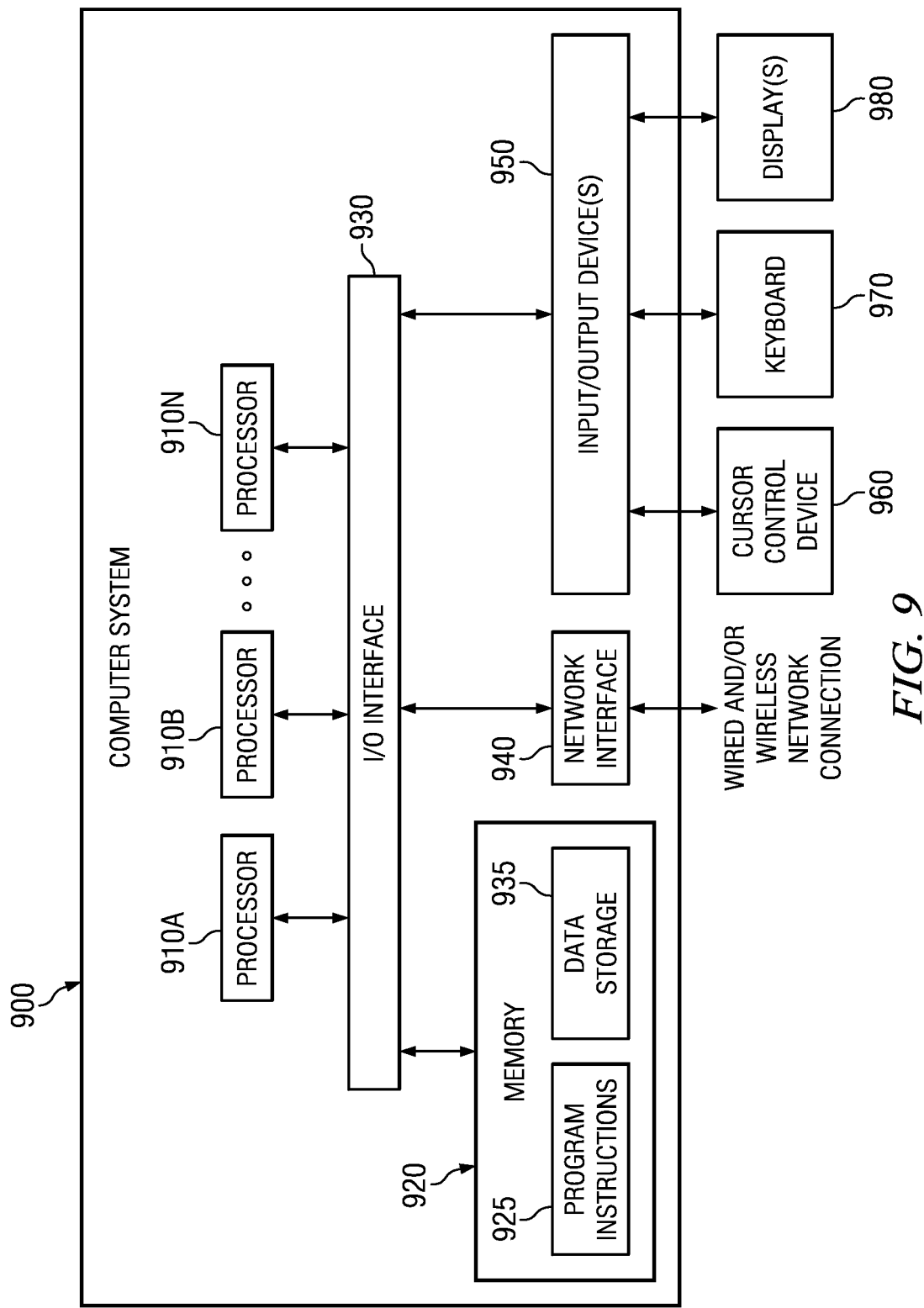
FIG. 9 is a block diagram of a computer system configured to implement various systems and methods described herein according to some embodiments.

Aspects of network monitoring system 100 may be implemented or executed by one or more computer systems. One such computer system is illustrated in FIG. 9. In various embodiments, computer system 900 may be a server, a mainframe computer system, a workstation, a network computer, a desktop computer, a laptop, or the like. For example, in some cases, front-end monitoring probe 205 shown in FIG. 2 may be implemented as computer system 900. Moreover, one or more of analyzer devices 210 and/or intelligence engine may include one or more computers in the form of computer system 900. As explained above, in different embodiments these various computer systems may be configured to communicate with each other in any suitable way, such as, for example, via network 100.

As illustrated, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some embodiments, a given entity (e.g., network monitoring system 110) may be implemented using a single instance of computer system 900, while in other embodiments multiple such systems, or multiple nodes making up computer system 900, may be configured to host different portions or instances of embodiments. For example, in an embodiment some elements may be implemented via one or more nodes of computer system 900 that are distinct from those nodes implementing other elements (e.g., a first computer system may implement classification engine 310 while another computer system may implement routing/distribution control module 330).

In various embodiments, computer system 900 may be a single-processor system including one processor 910, or a multi-processor system including two or more processors 910 (e.g., two, four, eight, or another suitable number). Processors 910 may be any processor capable of executing program instructions. For example, in various embodiments, processors 910 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 910 may commonly, but not necessarily, implement the same ISA. Also, in some embodiments, at least one processor 910 may be a graphics processing unit (GPU) or other dedicated graphics-rendering device.

System memory 920 may be configured to store program instructions and/or data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described herein, may be stored within system memory 920 as program instructions 925 and data storage 935, respectively. In other embodiments, program instructions and/or data may be received, sent or stored upon different types of computer-accessible media or on similar media separate from system memory 920 or computer system 900. Generally speaking, a computer-accessible medium may include any tangible storage media or memory media such as magnetic or optical media—e.g., disk or CD/DVD-ROM coupled to computer system 900 via I/O interface 930. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 940.

In an embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may be configured to allow data to be exchanged between computer system 900 and other devices attached to network 115, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 950 may, in some embodiments, include one or more display terminals, keyboards, keypads, touch screens, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, configured to implement certain embodiments described herein, and data storage 935, comprising various data accessible by program instructions 925. In an embodiment, program instructions 925 may include software elements of embodiments illustrated in FIG. 2. For example, program instructions 925 may be implemented in various embodiments using any desired programming language, scripting language, or combination of programming languages and/or scripting languages (e.g., C, C++, C#, JAVA®, JAVASCRIPT®, PERL®, etc.). Data storage 935 may include data that may be used in these embodiments. In other embodiments, other or different software elements and data may be included.

A person of ordinary skill in the art will appreciate that computer system 900 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

The various techniques described herein may be implemented in software, hardware, or a combination thereof. The order in which each operation of a given method is performed may be changed, and various elements of the systems illustrated herein may be added, reordered, combined, omitted, modified, etc. It will be understood that various operations discussed herein may be executed simultaneously and/or sequentially. It will be further understood that each operation may be performed in any order and may be performed once or repetitiously. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method for load balancing a large volume of network traffic into manageable segments, the method comprising the steps of:
   receiving a first and a second transaction between a Mobile Management Entity (MME) and a Serving Gateway (S-GW) over an S11 interface of a Long Term Evolution/Service Architecture Evolution (LTE/SAE) network using a control portion of a second version of a GPRS Tunneling Protocol (GTPv2-C);
   storing, in a memory, a first uplink user plane (UP) Tunnel Endpoint Identifier (TEId) and Internet Protocol (IP) address, a first downlink control plane (CP) TEId and IP address, and a first uplink CP TEId and IP address obtained from the first transaction, and a first downlink UP TEId and IP address obtained from the second transaction;
   creating a plurality of session segments based on: the first uplink UP TEId and the IP address; the first downlink CP TEId and the IP address; the first uplink CP TEId and the IP address; and the first downlink UP TEId and the IP address stored in the memory;
   identifying subsequent messages exchanged between an eNodeB and the S-GW over a direct tunnel using a user portion of a first version of the GTP protocol (GTPv1-U) as belonging to one of the plurality of session segments using at least one of: (i) the first uplink UP TEId and IP address; and (ii) the first downlink UP TEId and IP address to populate the session segments; and
   determining how to selectively analyze a subset of the network traffic based on the session segments and using a plurality of heuristics.

2. The method of claim 1, wherein the first transaction includes a create session request message transmitted from the MME to the S-GW and a corresponding create session response message transmitted from the S-GW to the MME.

3. The method of claim 2, further comprising:
   determining that the create session response message is transmitted in response to the create session request message based, at least in part, upon a comparison between: (i) the downlink CP TEId obtained from the create session request, and (ii) a header TEId obtained from the create session response.

4. The method of claim 3, wherein the second transaction includes a modify bearer request transmitted from the MME to the S-GW and a corresponding modify bearer response message transmitted from the S-GW to the MME.

5. The method of claim 4, further comprising:
determining that the modify bearer response message is transmitted in response to the modify bearer request message based, at least in part, upon a comparison between: (i) the downlink CP TEId obtained from the create session request, and (ii) a header TEId obtained from the modify bearer response.

6. The method of claim 1, wherein the first downlink UP TEId is a dynamically generated random number allocated to the given session, and wherein the first uplink UP TEId is another dynamically generated random number allocated to the given session.

7. The method of claim 1, further comprising:
receiving a third transaction between the MME and the Serving Gateway (S-GW) using the GTPv2-C;
storing, in a memory, a second uplink UP TEId and IP address and a second downlink UP TEId and IP address obtained from the third transaction; and
identifying one or more messages exchanged between the eNodeB and the S-GW over a direct tunnel using the GTPv1-U as belonging to the given session in response to the one or more messages including at least one of: (i) the second uplink UP TEId and IP address, or (ii) the second downlink UP TEId and IP address.

8. The method of claim 5, wherein the third transaction includes a create bearer request transmitted from the MME to the S-GW and a corresponding create bearer response message transmitted from the S-GW to the MME configured to establish a dedicated bearer within the given session.

9. The method of claim 1, further comprising:
receiving a third and fourth transactions between the MME and the Serving Gateway (S-GW) using the GTPv2-C;
storing, in a memory, a second uplink UP TEId and IP address obtained from the third transaction and a second downlink UP TEId and IP address obtained from the fourth transaction; and
identifying one or more messages exchanged between the eNodeB and the S-GW over a direct tunnel using the GTPv1-U as belonging to the given session in response to the one or more messages including at least one of: (i) the second uplink UP TEId and IP address, or (ii) the second downlink UP TEId and IP address.

10. The method of claim 5, wherein the third transaction includes another create session request message transmitted from the MME to the S-GW and another corresponding create session response message transmitted from the S-GW to the MME and wherein the fourth transaction includes another modify bearer request transmitted from the MME to the S-GW and another corresponding modify bearer response message transmitted from the S-GW to the MME, the third and fourth transaction configured to establish an additional default bearer within the given session.

11. The method of claim 1, further comprising:
receiving a third transaction between the MME and the Serving Gateway (S-GW) using the GTPv2-C; and
in response to the third transaction being a delete session transaction, deleting one or more UP TEIds stored in the memory corresponding to a default bearer or a dedicated bearer.

12. The method of claim 1, further comprising:
transmitting each of the one or more messages to a selected one of a plurality of session analyzer devices as part of a load balancing operation.

13. A session-aware packet monitoring probe for acting as a load balancer for network traffic, comprising:
a processor; and
a memory coupled to the processor, the memory configured to store program instructions executable by the processor to cause the monitoring probe to:
receive a create session transaction and a corresponding modify bearer transaction between a Mobile Management Entity (MME) and a Serving Gateway (S-GW) over an S11 interface of a Long Term Evolution/Service Architecture Evolution (LTE/SAE) network using a control portion of a second version of a GPRS Tunneling Protocol (GTPv2-C);
store, in a memory, a first uplink user plane (UP) Tunnel Endpoint Identifier (TEId) and Internet Protocol (IP) address, a first downlink control plane (CP) TEId and IP address, and a first uplink CP TEId and IP address obtained from the create session transaction, and a first downlink UP TEId and IP address obtained from the modify bearer transaction;
create a plurality of session segments based on: the first uplink UP TEId and the IP address; the first downlink CP TEId and the IP address; the first uplink CP TEId and the IP address; and the first downlink UP TEId and the IP address stored in the memory;
identify subsequent messages exchanged between an eNodeB and the S-GW over a direct tunnel using a user portion of a first version of the GTP protocol (GTPv1-U) as belonging to one of the plurality of session segments using at least one of: (i) the first uplink UP TEId and IP address, or (ii) the first downlink UP TEId and IP address to populate the session segments; and
determine how to selectively analyze a subset of the network traffic based on the session segments and using a plurality of heuristics.

14. The monitoring probe of claim 13, the program instructions executable by the processor to cause the telecommunications monitoring probe to:
receive a create bearer transaction between the MME and the S-GW using the GTPv2-C;
store, in the memory, a second uplink UP TEId and IP address and a second downlink UP TEId and IP address obtained from the create bearer transaction; and
identify one or more messages exchanged between the eNodeB and the S-GW over a direct tunnel using the GTPv1-U as belonging to the given session in response to the one or more messages including at least one of: (i) the second uplink UP TEId and IP address, or (ii) the second downlink UP TEId and IP address.

15. The monitoring probe of claim 13, the program instructions executable by the processor to cause the telecommunications monitoring probe to:
receive another create session transaction and another corresponding modify bearer transaction between the MME and the S-GW using the GTPv2-C;
store, in the memory, a second uplink UP TEId and IP address obtained from the other create session transaction and a second downlink UP TEId and IP address obtained from the other modify bearer transaction; and
identify one or more messages exchanged between the eNodeB and the S-GW over a direct tunnel using the GTPv1-U as belonging to the given session in response to the one or more messages including at least one of: (i) the second uplink UP TEId and IP address, or (ii) the second downlink UP TEId and IP address.

16. The monitoring probe of claim 13, the program instructions executable by the processor to cause the telecommunications monitoring probe to:
transmit each of the one or more messages to a selected one of a plurality of session analyzer devices as part of a load balancing operation.

17. A non-transitory tangible computer-readable storage medium having program instructions stored thereon that, upon execution by a processor within a computer system, cause the computer system to load balance a large volume of network traffic into manageable segments by performing the steps to:
- receive a modify bearer request transmitted from a Mobile Management Entity (MME) to a Serving Gateway (S-GW) over an S11 interface of a Long Term Evolution/Service Architecture Evolution (LTE/SAE) network using a control portion of a second version of a GPRS Tunneling Protocol (GTPv2-C);
- store, in a memory, a first downlink user plane (UP) Tunnel Endpoint Identifier (TEId) and Internet Protocol (IP) address and a first uplink control plane (CP) TEId and IP address obtained from the modify bearer request;
- identify a GTP header sequence number from the modify bearer request;
- receive a modify bearer response transmitted from the S-GW to the MME using the GTP-C;
- match the modify bearer response to the modify bearer request based, at least in part, upon the GTP header sequence number;
- store, in the memory, a first downlink CP TEId and IP address and a first uplink UP TEId and IP address obtained from the modify bearer response;
- create a plurality of session segments based on: the first uplink UP TEId and the IP address; the first downlink CP TEId and the IP address; the first uplink CP TEId and the IP address; and the first downlink UP TEId and the IP address stored in the memory;
- identify one or more messages exchanged between the MME and the S-GW using a user portion of the GTP (GTP-U) as belonging to a given session in response to the one or more messages including at least one of: (i) the first downlink UP TEId and IP address, or (ii) the first uplink UP TEId and IP address to populate the session segments; and
- determine how to selectively analyze a subset of the network traffic based on the given session and using a plurality of heuristics.

18. The non-transitory tangible computer-readable storage medium of claim 17, wherein to match the modify bearer response to the modify bearer request, the program instructions, upon execution by the processor, further cause the computer system to match a source IP address of the modify bearer request to a destination IP address of the modify bearer response.

19. The non-transitory tangible computer-readable storage medium of claim 17, wherein to match the modify bearer response to the modify bearer request, the program instructions, upon execution by the processor, further cause the computer system to match a destination IP address of the modify bearer request to a source IP address of the modify bearer response.

20. The non-transitory tangible computer-readable storage medium of claim 17, wherein the program instructions, upon execution by the processor, further cause the computer system to:
- transmit each of the one or more messages to a selected one of a plurality of session analyzer devices as part of a load balancing operation.

21. The monitoring probe of claim 13, the program instructions executable by the processor to cause the telecommunications monitoring probe to: track success, failure and timeout of each transaction with each session to capture changes to the first UP TEId and the first downlink UP TEId.

22. The monitoring probe of claim 13, the program instructions executable by the processor to cause the telecommunications monitoring probe to: fully monitor a session by distributing all control-plane and user-plane transactions to a single session analyzer device.

23. The monitoring probe of claim 22, the program instructions executable by the processor to cause the telecommunications monitoring probe to: synchronize with the single session analyzer device by adding meta-data with packets provided to the single session analyzer or out-of-band messaging.

* * * * *